UNITED STATES PATENT OFFICE.

VINCENT GRECO, OF NEW YORK, N. Y.

FOOD POWDER.

1,071,312. Specification of Letters Patent. Patented Aug. 26, 1913.

No Drawing. Application filed April 6, 1912. Serial No. 689,091.

*To all whom it may concern:*

Be it known that I, VINCENT GRECO, a citizen of the United States, residing at New York, in the county of New York and State of New York, have invented certain new and useful Improvements in Food Powders, of which the following is a specification.

This invention relates to what is known as food compounds, and is designed to provide what is known as a dry purée, which, when added to water will produce an appetizing, nourishing and palatable soup or purée.

It has been found that lentils, due to their leguminous nature are endowed with exceptional food properties, which in concentrated form are not only a desirable diet for invalids and convalescents but are also a food for people in good health.

The present invention is also a substitute for meat. Lentils, and in fact all of the seeds of leguminous plants contain a great percentage of nitrogen which is one of the life giving properties of meat and in fact is the principal element of meat. Therefore, lentils in their various forms, and particularly concentrated, form not only a vegetable food but also a substitute for meat, embodying the principal food properties of meat.

In carrying out the present invention, a number of lentils are placed in water and are boiled for several hours, preferably, two or three hours, salt being added during the boiling process to properly season the mixture. After two or three hours, the lentils are reduced to a plastic mass, the poisonous parts of the bean having passed off in the boiling. This mass is then strained or filtered, to remove as much of the water therefrom as possible. It is then placed in ovens and subjected to a heat of not more than 108 degrees Fahrenheit.

When thoroughly dried, the entire mass is subjected to a grinding process which reduces it to a very fine powder. Ten percent. of powdered sugar is then added to the powder thus obtained and a seasoning of powdered cinnamon, thus producing a very palatable powder. In utilizing this powder, two to four table spoon fulls thereof are added to eight to sixteen table spoon fulls of hot water, thus producing a thick palatable soup or purée, which is not only pleasing to the taste, but also contains a high percentage of nitrogen, and other life giving elements.

Having thus fully described my invention, what I claim as new and desire to secure by U. S. Letters Patent, is:—

1. A food compound consisting of powdered cooked lentils that have been previously seasoned with salt, sugar and cinnamon.

2. A food compound consisting of dry, boiled lentils seasoned with salt while being boiled and reduced to a powder, having added thereto powdered sugar in quantity approximating 10% by weight of the powdered cooked lentils aforesaid, and a seasoning of powdered cinnamon.

3. The process of preparing a food compound consisting in boiling lentils until thoroughly cooked, seasoning the lentils with salt during boiling, then removing the water from the lentils, then subjecting the lentils to heat of a low temperature until thoroughly dried, and finally reducing the lentils to a powder.

4. The process of making a food compound consisting in boiling lentils until thoroughly cooked, seasoning the lentils with salt during boiling, then removing the water from the lentils, then subjecting the lentils to heat of a low temperature until thoroughly dried, then reducing the lentils to a powder, then adding powdered sugar to the powdered lentils in quantity approximating 10% by weight of the lentil powder, and seasoning the mixture of lentil powder and sugar with powdered cinnamon.

In testimony whereof I affix my signature in presence of two witnesses.

VINCENT GRECO.

Witnesses:
BALDASSARE LANGE,
VITTOVIO SUSMANO.

---

Copies of this patent may be obtained for five cents each, by addressing the "Commissioner of Patents, Washington, D. C."